United States Patent [19]

Crouse

[11] Patent Number: 5,048,476

[45] Date of Patent: Sep. 17, 1991

[54] TWO-CYCLE INTERNAL COMBUSTION ENGINE

[76] Inventor: William H. Crouse, 1285 Gulf Shore Blvd., Naples, Fla. 33940

[21] Appl. No.: 596,012

[22] Filed: Oct. 11, 1990

[51] Int. Cl.[5] .............................................. F16F 13/00

[52] U.S. Cl. ............................ 123/90.66; 123/188 SA

[58] Field of Search ........... 123/188 SA, 90.28, 90.65, 123/90.66; 251/321

[56] References Cited

U.S. PATENT DOCUMENTS

| | | | |
|---|---|---|---|
| 1,029,685 | 6/1912 | Huff | 123/346 |
| 1,928,678 | 10/1933 | Sjolander | 123/90.66 |
| 3,853,102 | 12/1974 | Myers et al. | 123/90.66 |
| 4,312,494 | 1/1982 | Aoyama | 123/90.66 |

FOREIGN PATENT DOCUMENTS

| | | | |
|---|---|---|---|
| 1189792 | 3/1965 | Fed. Rep. of Germany | 123/90.66 |

*Primary Examiner*—David A. Okonsky
*Attorney, Agent, or Firm*—Cushman, Darby & Cushman

[57] ABSTRACT

A two-cycle, internal combustion engine utilizing a stepper motor to vary tension on an air intake valve. An air pump forces air through the valve but is opposed by forces due to a spring on the valve and pressure in the cylinder. By varying the compression of the spring, the stepper motor causes the valve to open for varied amounts of time thus controlling air flow into the cylinder according to operating conditions. The stepper motor, ignition timing and fuel injection are a controlled by an electronic control system.

15 Claims, 4 Drawing Sheets

TWO-CYCLE INTERNAL COMBUSTION ENGINE

BACKGROUND OF THE INVENTION

1. Field of the Invention

This invention relates to a design of a two-cycle internal combustion engine. More particularly, the present invention is an improvement over conventional two-cycle engine designs. The present invention may be configured to run on gasoline with spark ignition or on diesel fuel with compression ignition.

2. Description of the Related Art

Two-cycle engines are well known in the prior art. They are much simpler and have fewer moving parts than four-cycle engines. In addition, a two-cycle engine has a power stroke every crankshaft revolution for each cylinder, while a four-cycle engine has a power stroke every other crankshaft revolution for each cylinder. Thus a two-cycle engine will have twice as many power strokes per second as a four-cycle engine with the same number of cylinders. Previous designs have not allowed a two-cycle engine to be adequately controlled and fuel efficient in large horsepower sizes.

It is also known that the air intake of an internal combustion engine may be controlled by varying the spring tension on a suction intake valve. U.S. Pat. No. 1,029,685 to Huff is one example of an engine utilizing this type of control. The engine disclosed in Huff utilizes a complex mechanical linkage arrangement in order to vary the spring tension on a suction intake valve. This type of valve is opened by the vacuum created in the cylinder during the downstroke of the piston. Varying the spring tension on the valve will vary the amount of suction necessary in order to overcome the spring force and thus will vary the amount and time of valve opening. While this method will control the amount of air entering the cylinder, there is no precise control of the air and fuel mixture entering the cylinder. The result is a relatively inefficient and low performance engine.

SUMMARY OF THE INVENTION

Before describing the structure of the present invention in detail, this brief explanation of its operation will be offered. As the piston nears Top Dead Center (TDC) on the compression stroke, the fresh air present in the cylinder is compressed and fuel is injected. The spark then occurs (in the case of spark ignition), igniting the fuel and air mixture. The combustion then forces the piston down towards Bottom Dead Center (BDC). As the piston nears BDC, it clears the exhaust ports allowing the burned gas to exhaust from the cylinder. At the same time, the intake valve is opened so that fresh air may enter the cylinder, sweeping out and replacing most of the burned exhaust gasses. The piston then begins the next compression stroke, closing the exhaust ports and compressing the fresh air.

As in many present day engines, the fuel injection valve and the ignition timing are both controlled by a solid state electronic control module (ECM). The ECM monitors engine speed, accelerator pedal position, exhaust gas oxygen content and engine temperature in order to accurately control the fuel and air mixture in the combustion chamber so as to achieve the ideal stoichiometric air/fuel ratio of 14.7:1. The result is an engine that runs more efficiently at all speeds and under all operating conditions.

The present invention utilizes a stepper motor to vary compression in a spring that in turn exerts a force on the air intake valve. By varying the spring force on the valve, the duration of the open position for the valve during an engine cycle is varied. An ECM sends a signal to the stepper motor directing it to place a spring force on the valve corresponding to a desired duration of an open position for the valve.

The ECM monitors electrical signals from an accelerator pedal position sensor, an oxygen sensor, a position feedback from the stepper motor and other sensors. Based on these signals, the ECM precisely controls air intake, ignition and fuel injection timing and amount of fuel injected. The ability to precisely control the opening of the air intake valve and other system variables allows the engine of the present invention to operate at a high efficiency over a range of operating conditions. Further, the present invention eliminates the need for many mechanical components utilized in the prior art.

Other objects, features and characteristics of the present invention, as well as the methods of operation and function of the related elements of the structure, and the combination of parts and economies of manufacture, will become more apparent upon consideration of the following detailed description and the appended claims with reference to the accompanying drawings all of which form a part of this specification.

DETAILED DESCRIPTION OF THE PREFERRED EMBODIMENT

Figure 1:
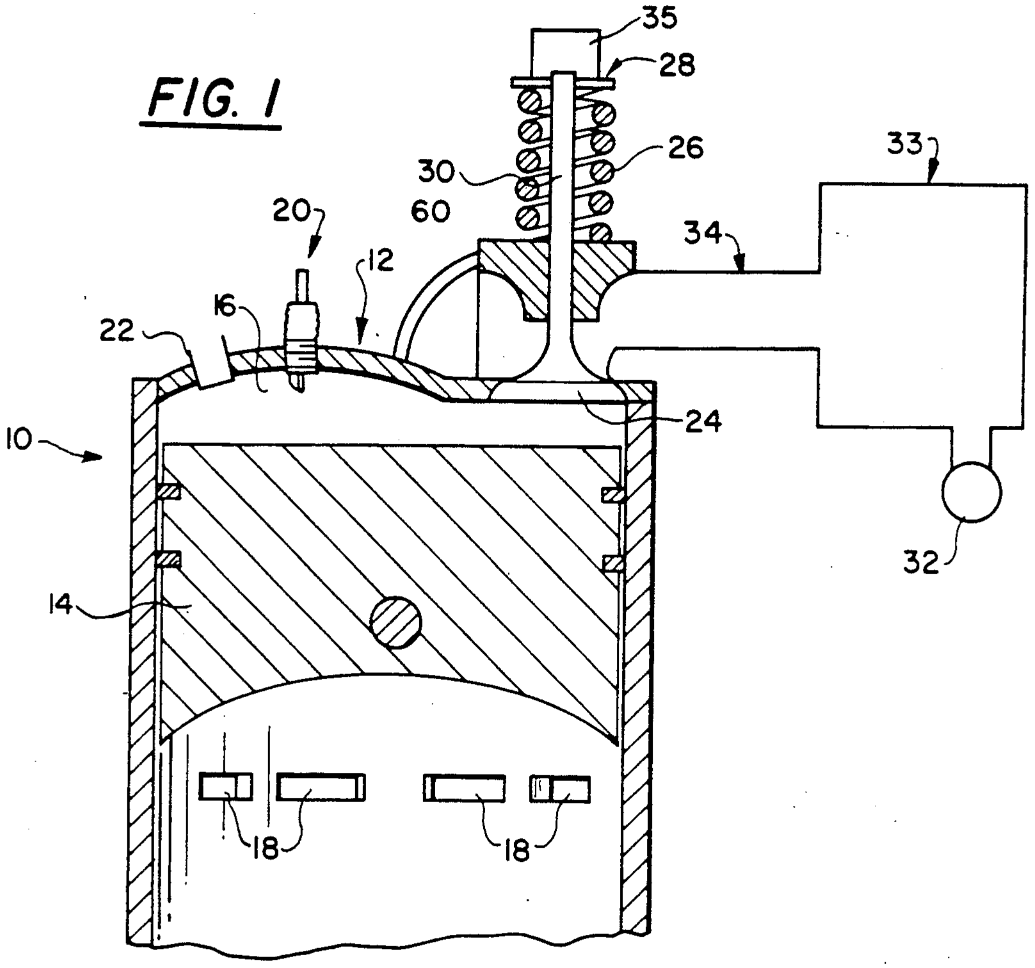
FIG. 1 is a sectional view of the cylinder of the preferred embodiment of the invention.

FIG. 1 illustrates the cylinder 10 of the preferred embodiment. While a single cylinder engine is shown, the present invention may be readily adapted to a multi-cylinder arrangement.

Cylinder head 12 has a dome shaped portion offset to one side of the axis of cylinder 10. Contained within cylinder 10 is piston 14. Piston 14 is, of course, slidably mounted to reciprocate within cylinder 10. At TDC, the top surface of piston 14 is in very close proximity to cylinder head 12, with the dome shaped portion of cylinder head 12 defining a combustion chamber 16. At BDC, piston 14 clears exhaust ports 18 allowing burned exhaust gasses to escape the cylinder.

Spark plug 20, fuel injection valve 22 and air intake valve 24 are all mounted in appropriate openings in cylinder head 12. If the present invention were to be adapted to diesel fuel and compression ignition, spark plug 20 and its opening would of course be omitted.

Air intake valve 24 is flush with the inside surface of cylinder head 12 when in the closed position. Retainer 28 fixes the position of the top portion of spring 26, with respect to valve stem 30, so as to maintain a force on air intake valve 24 tending to hold it in a closed position flush with cylinder head 12.

Stepper motor 60 is mounted on top of cylinder head 12 below spring 26 and is capable of expanding in dimension along the axis of valve stem 30, so as to place spring 26 in varying amounts of compression, upon receiving an appropriate electrical signal. As stepper motor 60 varies in size along the axis of valve stem 30, the bottom of spring 26 is moved up and down along valve stem 30 thus varying the compression of spring 26. As the compression of spring 26 varies, the forces opposing air charge pressure placed on air intake valve 24, by spring 26 and pressure within cylinder, vary. The structure and operation of stepper motor 60 is discussed in greater detail below.

Air pump 32 pumps pressurized air through pressure tank 33, air intake manifold 34 and air intake valve 24, and, when air intake valve 24 is open, into cylinder 10. Pressure tank 33 serves to smooth out pulses in charge pressure due to the abrupt opening and closing of air intake valve 24. A relief valve could also be placed on pressure tank 33 to avoid excessive charge pressure. Air intake valve 24 is held closed by the force due to spring 26 and by the pressure in cylinder 10 during most of the compression stroke and power stroke. When piston 14 reaches exhaust ports 18, as it moves down on the power stroke, The burned gasses quickly exhaust from cylinder 10. The result is a sudden drop in pressure in cylinder 10. Now air pressure from pressure tank 33 can overcome the force due to compression of spring 26 and the reduced pressure in cylinder 10. Air intake valve 24 is forced open and fresh air will enter cylinder 10.

The fresh air scavenges cylinder 10, largely replacing the burned gasses with fresh air. As piston 14 starts up in the compression stroke, it passes and seals off exhaust ports 18, ending the exhaust of gasses from cylinder 10.

Now piston 14 begins to compress the air in cylinder 10, thus the pressure in cylinder 10 increases. When the pressure in cylinder 10 is high enough, it combines with the force placed on intake valve 24 by spring 26 to overcome the intake air pressure from pump 32 and pressure tank 33. This causes air intake valve 24 to close and compression continues followed by fuel injection, ignition, and the commencement of another power stroke.

The instant that air intake valve 24 closes is a function of the compression of valve spring 28. When the accelerator pedal is at a position corresponding to idle, the accelerator position sensor tells ECM 40 that the engine should idle and thus should have less air. ECM 40 then commands stepper motor 60 to expand in dimension, and thus compress valve spring 26, thus increasing the force placed on air intake valve 24 by valve spring 26. In this case, the pressure in cylinder 10 must drop further, during exhaust, before air intake pressure can overcome the increased force, due to valve spring 26, and open air intake valve 24.

Conversely, as piston 14 moves up during compression, it takes less compression pressure in cylinder 10 to close air intake valve 24 because of the increased spring force applied on air intake valve 24 by valve spring 26. The result of the increased compression of valve spring 26 is to delay the opening of air intake valve 24 and also to close air intake valve 24 earlier in the compression stroke. This means that air intake valve 24 is open for a shorter period of time and thus less air enters cylinder 10. ECM 40 recognizes this and reduces the amount of fuel injected so as to maintain the desired stoichiometric air/fuel ratio.

The other operating extreme occurs when accelerator position sensor 42 signals ECM 40 that the accellerator pedal has been depressed, demanding more power and speed from the engine. In this case, ECM 40 commands stepper motor 60 to thin out in demension and thereby lessen the compression of valve spring 26 an amount corresponding to the amount of depression of the accelerator pedal. This reduces the compression in valve spring 26. With reduced forces applied, by valve spring 26, on air intake valve 24, due to the reduced compression, air intake valve 24 opens earlier as the exhaust phase of the power stroke starts. In addition, air intake valve 24 will stay open longer as piston 14 moves up on the compression stroke. The result is that more air enters cylinder 10. ECM 40 recognizes this and increases the amount of fuel injected in order to maintain the desired stoichiometric air/fuel ratio.

It can be seen from above that the interaction of stepper motor 60 with valve spring 26 is the deciding factor in how much air is allowed to enter cylinder 10. This, in turn, determines how much power the engine will produce.

During most of the power stroke of the engine, air intake valve 24 is held closed by the above-mentioned forces opposing air charge pressure. As these opposing forces change, due to the variable size of stepper motor 60, the amount of time that air intake valve 24 is opened changes. This allows more or less air to enter cylinder 10, as needed.

Figure 2:
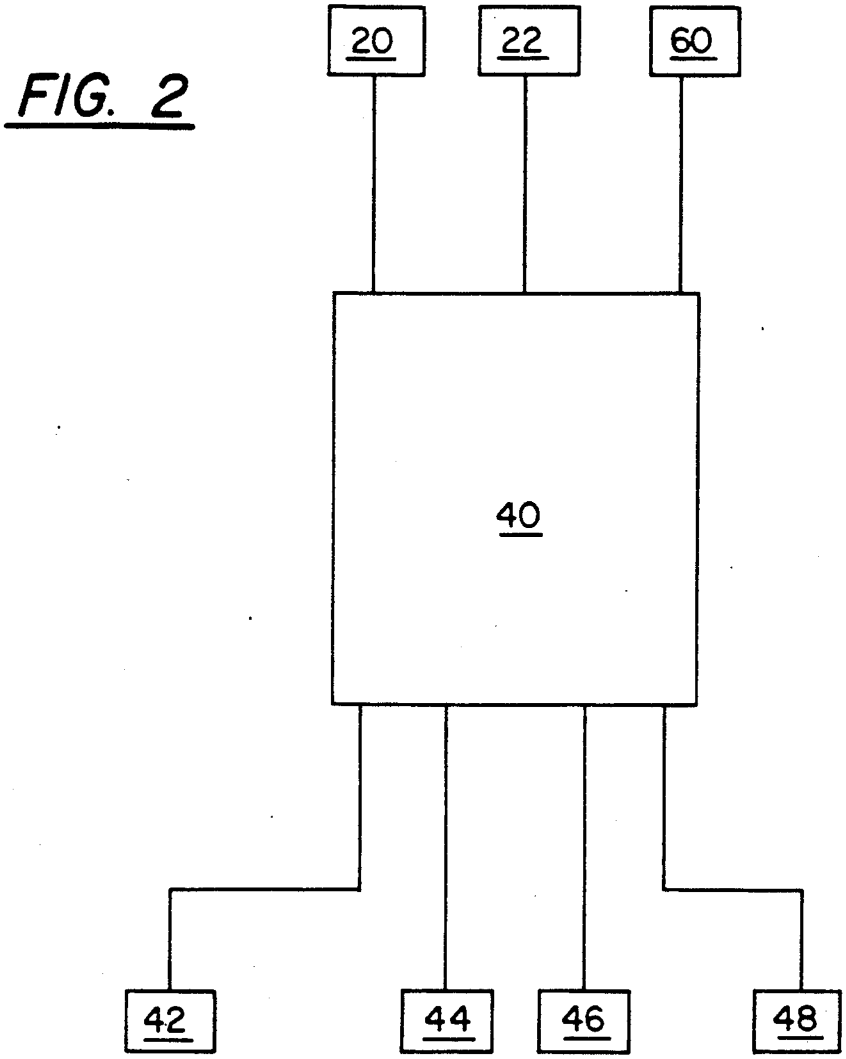
FIG. 2 is a block diagram of the control system of the preferred embodiment.

FIG. 2 is a block diagram of the electronic control system of the preferred embodiment. The center of the control system is electronic control module (ECM) 40. ECM 40 monitors signals from accelerator pedal position sensor 42, engine speed sensor 44, exhaust oxygen sensor 46 and engine temperature sensor 48. In turn, ECM 40 outputs control signals to fuel injection valve 22, spark plug 20 and stepper motor 60.

According to a predetermined program, ECM 40 adjusts the duration of opening of air intake valve 24, by means of a control signal sent to stepper motor 60, and the duration of opening of fuel injection valve 22 so as to maintain the ideal stoichiometric air/fuel ratio of 14.7:1 within the combustion chamber. Fuel injection valve 22 may be of a solenoid type or the like. Spark plug 20 ignition timing and fuel injection timing are advanced by ECM 40 as increased speed is sensed from engine speed sensor 44. This advancement of timing is well known in the prior art and increases combustion efficiency.

Figure 4:
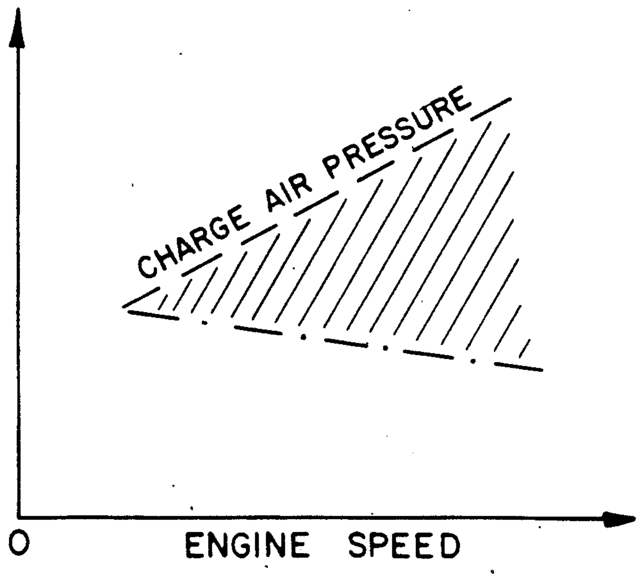
FIG. 4 is a graph of valve spring tension and charge air pressure with respect to rotational speed of the crankshaft.

FIG. 4 is a graph illustrating the relationship between air intake pressure valve spring tension (near BDC) and engine speed. The shaded area represents the amount of air entering cylinder 10. It is apparent that as spring tension decreases, speed, charge pressure and the amount of air entering cylinder 10 all increase.

The basic operation of the preferred embodiment is similar to that of all two-cycle engines and has been described above. However, the unique structure of the preferred embodiment allows the combustion to be essentially complete and efficient. Note the dome shaped portion of cylinder head 12 and that the bottom surface of air intake valve 24 is flush with the bottom surface of cylinder head 12 when in a closed position. This allows for a minimum clearance between piston 14 and cylinder head 12 when piston 14 is at TDC. This small space defines a "squish area". As piston 14 reaches TDC air is forced or "squished" out of this area into combustion chamber 16.

Figure 3:
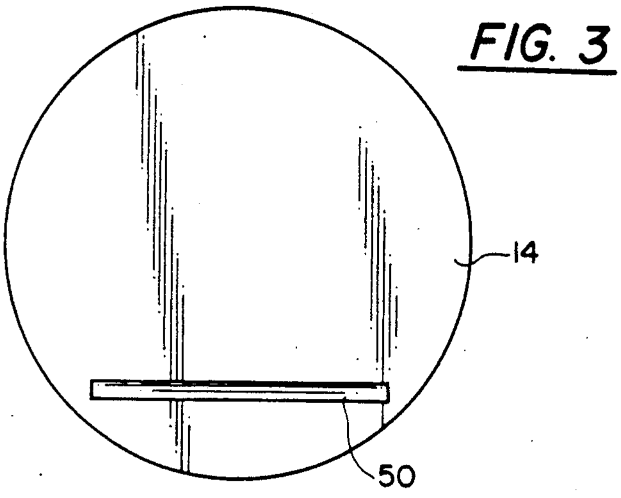
FIG. 3 is a top view of the piston of the preferred embodiment.

This action, coupled with the dome shape of combustion chamber 16, produces a high swirl of air aiding in a complete mixture of the air with the fuel thus increasing combustion efficiency. FIG. 3 shows a groove that is machined into the top surface of piston 14, channeling the air from the "squish" area to one side of combustion chamber 16 helping to produce the swirl within combustion chamber 16.

Figure 5:
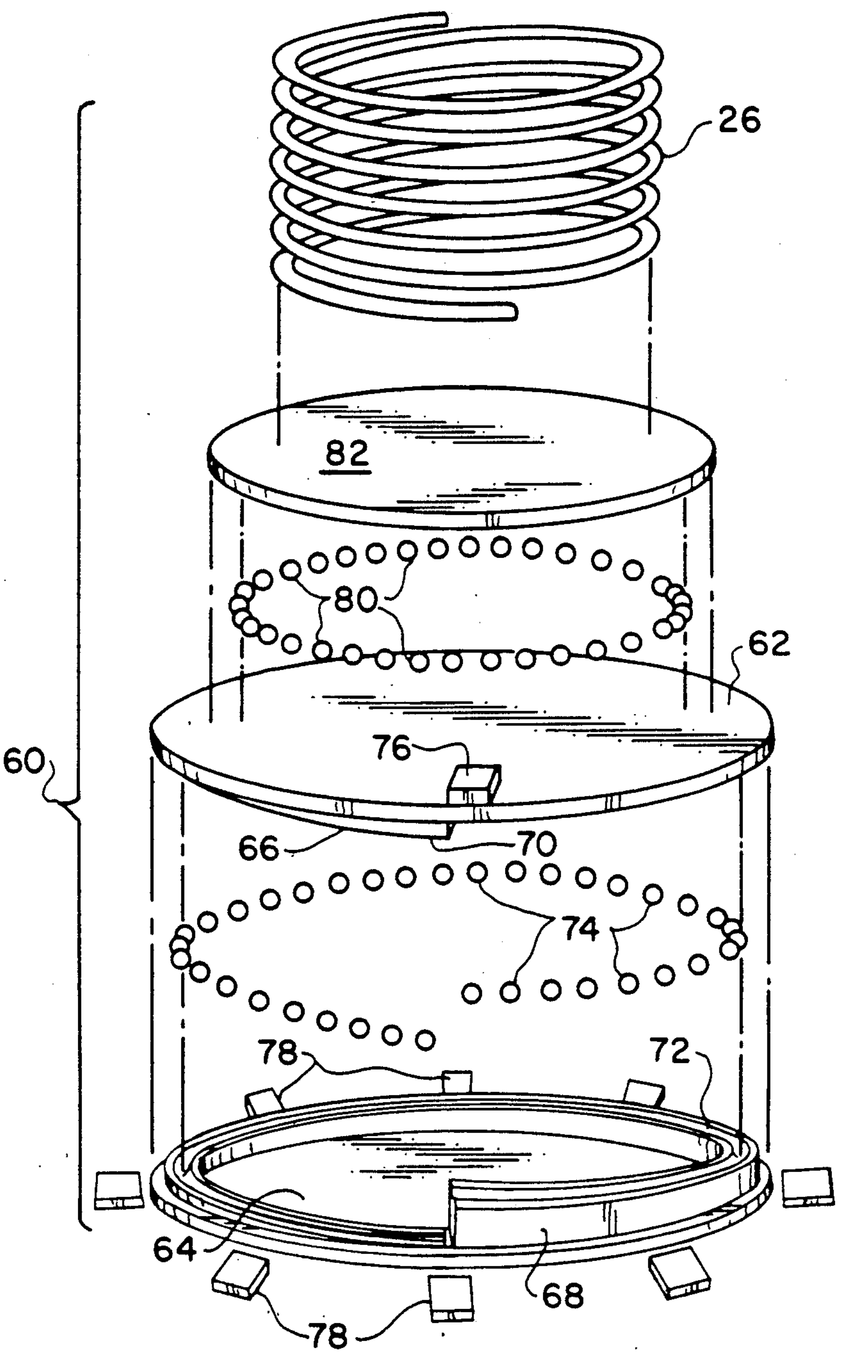
FIG. 5 is an exploded view of the stepper motor and its interface with the valve spring.
Figure 5A:
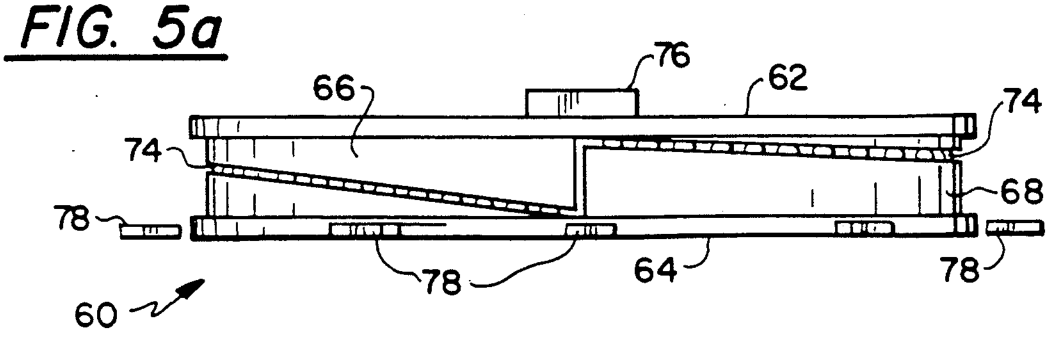
FIG. 5*a* is a side view of the stepper motor.

FIG. 5 illustrates the stepper motor 60 of the preferred embodiment. An upper plate 62 and lower plate 64 each have a circular inclined plane, 66 and 68 respectively, thereon. The inclined planes 66 and 68 are configured to be matching. Each inclined plane 66 and 68 has a groove, 70 and 72 respectively, machined into its surface. Balls 74 (several of which are indicated) are placed into groove 72 and upper plate 62 rests thereon with groove 70 holding balls 74 in place. This arrangement acts as a bearing, allowing upper plate 62 to rotate with respect to lower plate 64 with very little frictional resistance.

Upper plate 62 has a fixed magnet 76 located at its perimeter. Eight electromagnets 78 are equally spaced about the perimeter of lower plate 64. Electromagnets 78 can be individually controlled by ECM 40 so as to cause upper plate 62 to rotate, due to magnetic force, into a desired orientation with respect to lower plate 64. As upper plate 62 rotates, the thickness of stepper motor 60 will change due to the interface of balls 74 with inclined planes 66 and 68.

As the thickness of stepper motor 60 changes, spring 26 is compressed or relaxed accordingly. ECM 40 will control electromagnets 78 so as to orient upper plate 62 in a position that places the proper tension on spring 26 for optimum engine control as described above, according to a predetermined program.

Plates 62 and 64 are constructed of brass or another non-magnetic material so as to not interfere with the operation of electromagnets 78. Grooves 70 and 72 may be lined with steel or another wear resistant material. The number of electromagnets 78 and the slope of inclined planes 64 and 66 will be designed so as to provide the proper change in thickness according to system variables such as spring characteristics etc. . . . Bearings 80 and disc 82 are placed on top of upper plate 62, serving as a bearing element between stepper motor 60 and spring 26.

In addition, a conventional valve rotator 35, such as that disclosed in Automotive Engines by Crouse and Anglin (1986) 7th Edition, may be combined on valve stem 30, with stepper motor 60 to rotate valve 30 incrementally after each stroke in order to minimize wear on valve 30 (see FIG. 1).

While the preferred embodiment utilizes a specific stepper motor arrangement, it would be within the scope of the present invention to utilize a cam and follower, a threaded shaft and nut combination, a solenoid or the like for the purpose of adjusting the tension of spring 26.

Figure 6:
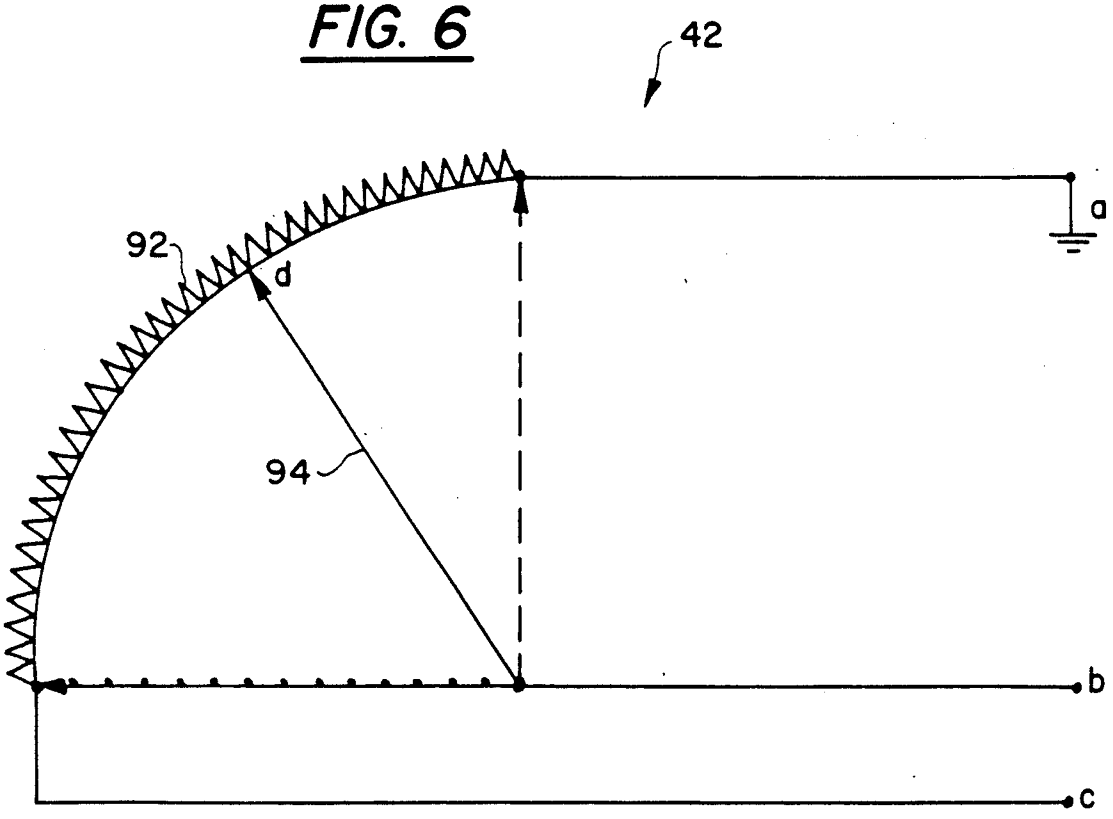
FIG. 6 is a schematic representation of the accelerator pedal position sensor of the preferred embodiment.

FIG. 6 is a schematic representation of the accelerator pedal position sensor 42 of the preferred embodiment. This sensor is a standard rheostat device. The throttle pedal (not illustrated) is mechanically coupled to wiper 94 which is electrically connected to an input of ECM 40, at b, and slidably contacts resistive element 92, at d.

Resistive element 92 is electrically connected to a constant voltage source, at c, and a ground source at a. Thus, as the accelerator pedal is depressed, wiper 94 slides along resistive element 92 and varies the voltage received by ECM 40 at b. A released position of the accelerator pedal corresponds to a low voltage at b and is indicated by the dashed line. A fully depressed position of the accelerator pedal corresponds to a high voltage at b and is indicated by the dotted line.

The voltage at b will vary proportionally to the position of wiper 94 along resistive element 92. While the accelerator pedal position sensor of the preferred embodiment is a rheostat, the sensor may be any type of transducer that will convert the position of the throttle pedal to a useful electric signal.

It should be noted that because the accelerator pedal position sensor may be a rheostat, or the like, there is no mechanical connection between the driver's compartment and the engine. This increases the flexibility of location of the present invention. For example, one engine could be easily located at each the front and the back of a vehicle. Each engine could be switched on or off as needed.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed:

1. An internal combustion engine, comprising:

a cylinder;

a piston slidably mounted in said cylinder;

a cylinder head enclosing one end of said cylinder so as to define a combustion chamber within said cylinder between said piston and said cylinder head;

fuel injection means for allowing fuel to enter said combustion chamber;

intake means for allowing air to enter said combustion chamber;

ignition means for igniting a mixture of said fuel and said air in said combustion chamber;

at least one exhaust port for allowing burned exhaust gases to escape said combustion chamber;

said intake means comprising;

an aperture in said cylinder head;

a valve, having an elongated stem, capable of opening and closing said aperture;

an air pump forcing pressurized air into said cylinder through said aperture;

a spring, exerting a force on said valve, in opposition to a force created by said air pump, said valve opening when said pressure in said pressurized air exerts a force on said valve greater than a sum of forces exerted, on said valve, by said spring and a pressure in said cylinder due to motion of said piston; and tension varying means for varying compression in said spring during a stroke and thus varying said force, exerted by said spring, so as to vary the duration of an open position of said valve during an engine cycle.

2. An internal combustion engine as described in claim 1 further comprising:

accelerator pedal position sensing means for sensing a accelerator pedal position and outputting a corresponding electrical signal;

engine speed sensing means for sensing a rotational speed and position of a crankshaft of said engine and outputting a corresponding electrical signal;

control means for monitoring said signal from at least one of said oxygen sensing means and said accelerator pedal position sensing and outputting control signals to at least one of said injection means said ignition means and said tension varying means so as to maintain a preselected air to fuel ratio and proper ignition and fuel injection timing throughout a range of operating conditions.

3. An internal combustion engine as described in claim 2, wherein said tension varying means is a stepper motor assembly capable of variably compressing said spring, in response to an electrical signal from said control means, thus varying said force exerted by said spring on said valve, said stepper motor assembly being capable of sending a feedback signal to said control means corresponding to a variance in said dimension.

4. An internal combustion engine as described in claim 3 wherein said stepper motor assembly comprises:

two plates each with a matching inclined plane thereon, said inclined planes extending along at least a portion of said plates and having a extending lengthwise thereon;

said plates being placed in opposition to each other so as to place said inclined planes in a position substantially parallel to each other;

said grooves holding a plurality of spheres therebetween so as to allow said spheres to roll along said inclined planes in said grooves when said plates are rotated with respect to each other thus minimizing frictional forces between said inclined planes and said spheres;

a permanent magnet attached to one of said plates;

a plurality of electromagnets attached to the other of said plates, said electromagnets being capable of being independently energized and deenergized so as to interact with said permanent magnet thus producing a force causing said plates to be placed in a predetermined desired orientation with respect to each other, a distance between said plates varying, when said plates move with respect to each other, due to engagement of said inclined planes via said spheres.

5. An internal combustion engine as described in claim 4 wherein, said plates are round and said inclined planes extend along at least a portion of a perimeter of said plates.

6. An internal combustion engine as described in claim 1, wherein said cylinder head has a dome shaped portion concave with respect to said piston, said ignition means and said fuel injection means being located within said dome shaped portion, said dome shaped portion and said piston defining a combustion chamber when said piston is at the top of a stroke.

7. An internal combustion engine as described in claim 6, wherein said piston and said cylinder head have a minimum of clearance therebetween, when said piston is at a position of a stroke closest to said cylinder head, said clearance defining a compression area, so as to force air in said cylinder into said dome shaped portion of said cylinder head.

8. An internal combustion engine as described in claim 7, wherein said piston has a groove formed in a top surface so as to act as a channel directing air forced out of said squish area into said dome shaped portion of said cylinder head.

9. A stepper motor assembly for varying compression on a valve spring, wherein said stepper motor assembly varies in dimension in response to a control signal so as to displace at least one end of said spring thus varying the compression of said spring and the force exerted on said valve, said stepper motor assembly having a feedback means for sending a signal, to a controller, corresponding to a variance in said dimension.

10. A stepper motor assembly as described in claim 9, comprising:

two plates each with a matching inclined plane thereon, said inclined planes extending along at least a portion of said plates and having a extending lengthwise thereon;

said plates being placed in opposition to each other so as to place said inclined planes in a position substantially parallel to each other;

said grooves holding a plurality of spheres therebetween so as to allow said spheres to roll along said inclined planes in said grooves when said plates are rotated with respect to each other thus minimizing frictional forces between said inclined planes and said spheres;

a permanent magnet attached to one of said plates;

a plurality of electromagnets attached to the other of said plates, said electromagnets being capable of being independently energized and deenergized so as to interact with said permanent magnet thus producing a force causing said plates to be placed in a predetermined desired orientation with respect to each other, a distance between said plates varying, when said plates move with respect to each other, due to engagement of said inclined planes via said spheres.

11. A stepper motor assembly as described in claim 10, wherein said plates are round and said inclined planes extend along at lease a portion of a perimeter of said plates.

12. An internal combustion engine as described in claim 1, further comprising:

valve rotating means for incrementally rotating said valve during operation so as to create even wear on said valve.

13. An internal combustion engine as described in claim 1, further comprising:

an air passage positioned at an angle to said aperture, between said aperture and said air pump, so as to impart a swirl to said pressurized air entering said cylinder.

14. An internal combustion engine as described in claim 11, wherein said air passage has an enlarged portion so as to substantially absorb pulses in pressure of said pressurized air.

15. An interval combustion engine as described in claim 12, wherein said accelerator pedal position sensing means is a rheostat device.

* * * * *